United States Patent
Bachhausen et al.

[11] Patent Number: 5,230,586
[45] Date of Patent: Jul. 27, 1993

[54] METHOD FOR THE MICROBIOLOGICAL DECONTAMINATION OF SOIL

[75] Inventors: Peter Bachhausen, Nottuln; Karl-Heinz Kersting; Hans-Jürgen Rehm, both of Münster, all of Fed. Rep. of Germany

[73] Assignee: BASF Lacke & Farben Aktiengesellschaft, Munster, Fed. Rep. of Germany

[21] Appl. No.: 721,506
[22] PCT Filed: Jan. 4, 1990
[86] PCT No.: PCT/EP90/00016
§ 371 Date: Jul. 11, 1991
§ 102(e) Date: Jul. 11, 1991
[87] PCT Pub. No.: WO90/07992
PCT Pub. Date: Jul. 26, 1990

[30] Foreign Application Priority Data

Jan. 14, 1989 [DE] Fed. Rep. of Germany ....... 3901050

[51] Int. Cl.$^5$ ............................. B09B 3/00; E02D 3/00
[52] U.S. Cl. ....................................... 405/128; 405/36; 405/258
[58] Field of Search ................. 405/52, 128, 129, 258, 405/263, 266, 36; 210/747

[56] References Cited

U.S. PATENT DOCUMENTS

| | | | |
|---|---|---|---|
| 4,350,461 | 9/1982 | Valiga et al. | 405/128 |
| 4,765,902 | 8/1988 | Ely et al. | 405/128 X |
| 4,849,360 | 7/1989 | Norris et al. | 405/128 X |
| 4,850,745 | 7/1989 | Hater et al. | 405/258 |
| 4,865,488 | 9/1989 | Huston et al. | 405/129 |

FOREIGN PATENT DOCUMENTS

| | | |
|---|---|---|
| 0192285 | 8/1986 | European Pat. Off. . |
| 0275096 | 7/1988 | European Pat. Off. . |
| 3720833 | 8/1988 | Fed. Rep. of Germany . |
| 2608628 | 6/1988 | France . |

Primary Examiner—David H. Corbin

[57] ABSTRACT

The present invention relates to a method for the microbiological decontamination of soil, in which
1) the contaminated soil is excavated and treated,
2) the treated soil is banked up on a prepared subsoil in the form of regeneration clamps, and
3) the clamps are provided with oxygen while microbiological degradation of the contaminants takes place.

The method comprises mixing the contaminated soil with, preferably contaminated, concrete and/or building rubble, before the mixture is banked up in the form of regeneration clamps, the concrete and/or building rubble having been comminuted before mixing to a particle size of $\leq 10$ mm, preferably $\leq 6$ mm.

The method according to the invention makes possible, within a short time, decontamination even of soils whose permeability for air and water is only low, and also of soils where the distribution of contaminants is highly inhomogeneous, or where the concentration of contaminants is very high.

Particularly good results are achieved when the clamps are additionally sprinkled with treated water from the operator's own treatment plant.

15 Claims, 1 Drawing Sheet

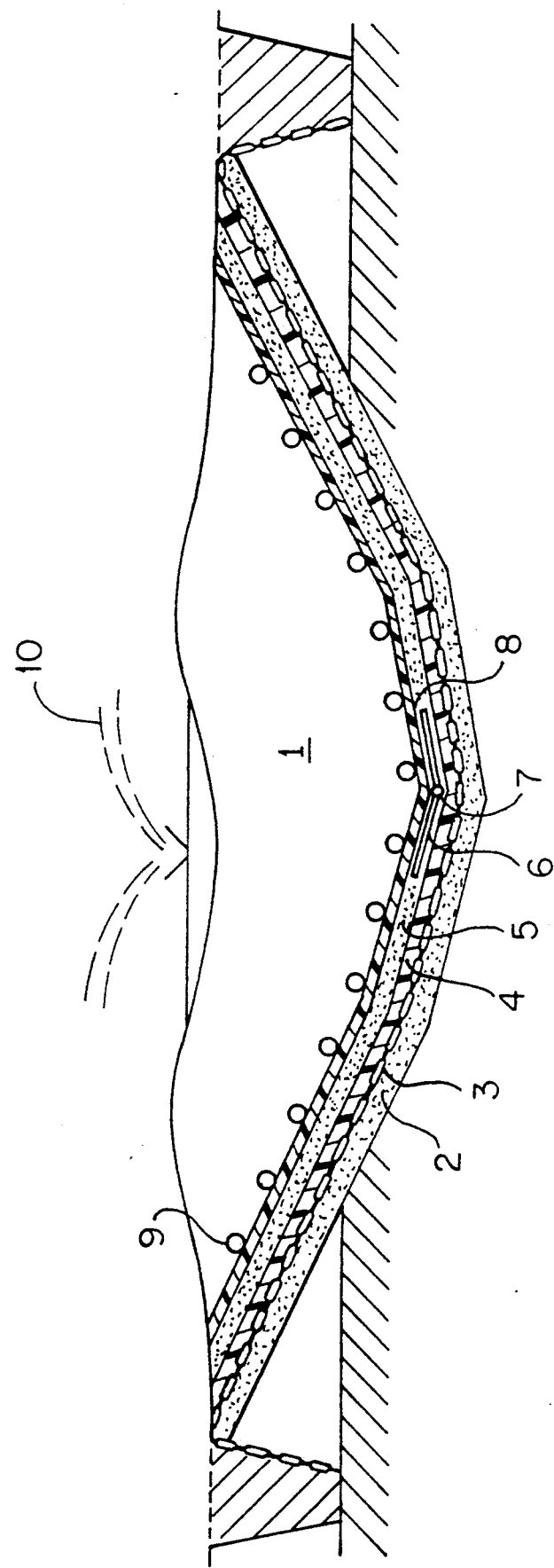

METHOD FOR THE MICROBIOLOGICAL DECONTAMINATION OF SOIL

The present invention relates to a method for the microbiological decontamination of soil, in which
1) the contaminated soil is excavated and treated,
2) the treated soil is banked up on a prepared subsoil in the form of regeneration clamps, and
3) the clamps are provided with oxygen while microbiological degradation of the contaminants takes place.

Decades of industrial utilization of terrain resulted in pollution of the soil, for example caused by inappropriate deposition of residues and leakages from tank systems, pipeline systems and pump systems. Such contaminations require a treatment if they adversely influence the groundwater or when polluted soil must be excavated for building purposes.

The contaminants which lead to soil contamination can belong to a wide class of substances and can have very different origins. Examples of potential contaminants include mineral oils of all processing stages (degrees of refining), such as crude oils, diesel oils, fuel oils, gasolines, industrial oils, furthermore chlorohydrocarbons, such as trichloroethylene, tetrachloroethylene, trichloroethane and dichloromethane, organic solvents, such as, for example, phenols, alcohols, aromatic hydrocarbons, aldehydes, acids, esters, ketones and ethers, but also various plastics, various other organic and inorganic substances and, last but not least, also pesticides and herbicides.

Many procedures are possible for the sanitation of contaminated soils. For example, there are the so-called "on-site" methods, in which the contaminated soil is first removed. In a different location, the contaminants are then removed by means of various treatment methods, such as, for example, thermally, chemically, microbiologically or by means of mechanical washing, and the purified soil is used to fill up the cavities formed by removal of the soil.

A method which has proved economical is the microbiological "on-site" degradation of harmful organic substances. The desired end products of the aerobic degradation of organic substances are carbon dioxide and water. A decisive factor for optimum removal of harmful organic substances is the adjustment of so-called environmental factors—such as, for example, oxygen content, pH, moisture and the presence of sufficient amounts of nutrients for the microorganisms. Other factors, such as, for example, the solubility of the harmful substances in water, are also highly important.

Since there is such a multitude of factors, many different methods for microbiological "on-site" degradation of harmful organic substances have been described (cf., for example, Chem.-Ing.-Tech. 59 (1987), No. 6, pages 457–464). For example, in the Shell BIOREG method (cf. Chem.-Ing.-Tech. 59 (1987), No. 6, page 461, right-hand column), the excavated contaminated soil is mixed with ground pine bark on a prepared subsoil and banked up in the form of regeneration clamps (height: 1.2 m). It is also possible to additionally incorporate aeration layers equipped with drainage pipes.

In another method (cf. Chem.-Ing.-Tech. 59 (1987), No. 6, page 461, right-hand column), contaminated soil is mixed with organic material (for example straw) and then inoculated with fungi causing white rot in order to break down polycyclic aromatic hydrocarbons. The fungi possess an enzyme system which is capable of breaking down cellulose and also suitable for breaking down the polycyclic aromatic hydrocarbons.

Finally, an experiment carried out by Deurag is also known (cf. Wirtschaftswoche No. 37 of Sep. 9, 1988, pages 101 and 102) in which the contaminated soil is first simply spread and waste water from the company's own sewage plant which contained bacteria was sprinkled onto the soil. After this, all that happened was that the soil was turned over twice per year and time was allowed to pass (principle of "land farming").

A great disadvantage of the known biological soil decontamination methods is the limited applicability with regard to the nature of the soil. For example, silty clay materials are not accessible to a microbiological sanitation because of their low permeability to air and water. Other grave disadvantages of the known "on-site" methods which work with microbiological purification of the soils are, in particular, the very slow degradation of the contaminant—the durations of the treatments described in the literature are of up to 4 years—as well as the occurrence of problems in the case of soils where the concentration of pollutants is very high (i.e. about >2000 mg/kg), or in the case of soils where distribution of the individual pollutants is highly inhomogeneous. Moreover, methods in which the contaminated soil is mixed with tree bark or chopped straw for sanitation purposes have the disadvantage that the bearing capacities of such soils are greatly reduced and the soil is therefore unsuitable as foundation soil.

It was therefore the object of the present invention to provide a method for the microbiological decontamination of soil, in which it is possible to sanitate even polluted soils which could be regenerated only with difficulty or not at all using conventional microbiological methods, while keeping the treatment time as short as possible. For example, the methods should make it possible to decontaminate in particular also finely-particulate materials whose permeability for air and water is only low, for example silty clay materials, and also soils where the distribution of the pollutants is highly inhomogeneous, or those where the concentration of the pollutants is very high.

The object is achieved according to the invention by a method for the microbiological decontamination of soil, in which
1) the contaminated soil is excavated and treated,
2) the treated soil is banked up on a prepared subsoil in the form of regeneration clamps, and
3) the clamps are provided with oxygen while microbiological degradation of the contaminants takes place.

The process comprises a treatment of the contaminated soil, in which the soil is mixed with concrete and/or building rubble which has previously been comminuted to a particle size of <10 mm, preferably ≦6 mm.

It was surprising and not predictable that in the method according to the invention the concentration of harmful substances in contaminated soils is reduced drastically after an extremely short period of, in general, less than 1 year, even only ½ year, so that these soils can be used for filling the cavities resulting from the removal of soil. Due to the firmness, these soils are also suitable as a foundation subsoil. Another important advantage of the method according to the invention is the fact that even finely-particulate soils whose permeability for air and water is only low, such as, for example, silty clay materials, as well as soils whose concentration of pollutants is high and/or where the distribution of pollutants is inhomogeneous, can be decontaminated with outstanding results.

The sanitation method according to the invention first requires that a treatment area is established for accommodating the material t be disposed of. These treatment areas usually consist of a flat excavated pit next to which there are dykes banked up with the soil which has been excavated. To avoid contamination of the subsoil of the treatment area and, if appropriate, also of the groundwater, it is necessary to seal off the subsoil. For sealing, films, for example plastic films, are generally employed and then covered with about 10 cm of sand, it being necessary to provide suitable measures for checking the tightness of the individual webs of film in the area where they overlap. For example, it is possible to introduce copper wires in the areas where the webs of plastic overlap, and the tightness can be checked after the individual webs have been welded together, via inductive measurements. It is preferred to further apply a protective nonwoven to the sealing webs.

In a preferred embodiment, the protective nonwoven is further provided with a layer of gravel incorporating drainage and a filter nonwoven as a cover. This arrangement has the advantage that, on the one hand, any water which occurs, such as, for example, percolating water, water from precipitation and treatment water, can be collected and fed to a treatment plant, on the other hand, since a drainage is installed, it is also possible to combine the microbiological decontamination with the extraction method. For details of this method, see pages 11 to 12 of this description.

An important factor in the microbiological decontamination of soil is the adjustment of optimum environmental factors for the microorganisms, which also includes a sufficient supply of the microorganisms with oxygen. Apart from the possibility of employing chemical oxygen donors, it is also possible to employ atmospheric oxygen as the most inexpensive and natural microbial Oxidant. To ensure a sufficient supply of oxygen, the treatment area is therefore preferably additionally provided with an aeration system. Possibilities in this context are both passive aeration by means of drainage pipes or active aeration, or a combination of active and passive aeration. In the case of active aeration, filter tubes are built in above the filter nonwoven or the protective nonwoven, if no drainage had been provided. The diameters of suitable filter tubes are in general between 25 and 300 mm. The distance of the tubes to each other is between 1 and 10 m. The individual tubes are connected to a collector line at which there is arranged a compressor. Preferably, sluice valves which allow specific aeration of individual clamps, are additionally arranged in the individual connection lines of the filter pipes. In addition to guaranteeing optimum aeration, the arrangement of such a filter tube system also has the advantage that this tube system can also be employed for pumping away soil air by simply exchanging the compressor for an appropriate pumping device. Such a combination of pumping of soil air and microbiological degradation is expedient in particular when highly volatile contaminants are present besides other pollutants.

As is the case in all so-called on-site methods, the method according to the invention provides that the contaminated soil is first excavated and treated for the elimination process. According to the invention, this treatment consists of mixing the contaminated soil with concrete and/or building rubble which, preferably, is likewise contaminated. The concrete and/or building rubble has previously been comminuted to a particle size of $\leq 10$ mm, preferably $\leq 6$ mm, using suitable crushing plant. The mixing ratio of soil to concrete and/or building rubble is in general between 1:9 parts by volume and 9:1 parts by volume, preferably between 1:1 and 3:1 parts by volume, very particularly preferably between 1.5:1 and 2:1 parts by volume. The optimum mixing ratio for the specific conditions prevailing can be determined without difficulty by anyone skilled in the art with the aid of a few routine experiments.

The addition of concrete and/or building rubble facilitates adsorption of the microorganisms and s results in their immobilization. This in turn leads to a higher multiplication rate of the microorganisms, which means that higher amounts of contaminants in the soil can be degraded. In the preferred use of specialized bacterial strains which have already adapted to the contamination (for example by using a strain mixture from the operator's own treatment plant), these specialized strains form a colony by the addition of the concrete and/or building rubble, and, caused by absorption, they are then available for a substantial time in the soil for the elimination process. Because of the immobilization, this specialized strain can dominate over the usually present soil microflora for a substantial time. In addition, the addition of likewise contaminated concrete and/or building rubble has the advantage that this material is likewise eliminated and does not have to be deposited in special tips, as usual. The addition of comminuted concrete and/or building rubble to very fine material whose permeability of air and water is only very low, such as, for example, silty clay material, improves the permeability of air and water, and the tendency which is often observed in such materials, to cake after prolonged, intensive precipitations, is drastically reduced. Finally, this treatment of the contaminated material results in a leveling effect, i.e. in a reduction of contamination peaks, since usually the various contaminants are distributed unevenly in the soil and concrete or building rubble.

The contaminated soil which has been treated in this manner is now banked up in the treatment area in the form of regeneration clamps. The height of these clamps is usually not more than 2 m.

The actual treatment consists of the activation of the microbiological degradation by adjusting suitable environmental factors. This includes the supply of the microorganisms with oxygen, which has already been explained in the description of the treatment area on pages 6 and 7 of this description, for example by active and/or passive aeration. Furthermore, care must be taken to provide a suitable distribution of moisture. It is therefore preferred to irrigate the clamps, the additional amount of moisture ideally being adjusted as a function of the weather (for example amount of precipitation, ground frost etc.). It is also preferred to monitor the addition of nutrients, such as phosphate and ammonium, together with the irrigation. Finally, atmospheric oxygen is also passed in by the irrigation. However, it is also possible to add an oxygen donor to the treatment water.

In many cases, the microorganisms which are required for the microbiological degradation of the contaminants are already present in the contaminated soil, and degradation of the contaminants does not take place because of a lack of suitable environmental factors. In contrast, degradation of the contaminants takes place when, for example, a sufficient oxygen content and sufficient moisture have been established in the soil.

Besides, there is also the possibility of adding specifically cultured microorganisms to the soil. However, it is preferred to add microorganisms which are already adapted to the contaminants. A highly advantageous variant consists in irrigation of the treatment area with waste water from the operator's own treatment plant. In this case, the microorganisms are already adapted to the soil pollutants since the contaminants are constantly fed into the treatment plant in the form of waste water constituents. Simultaneously, the waste waters of the treatment plant contain sufficient growth substances, such as nitrogen and phosphate, so that it is not necessary to enrich the treatment water with nutrients.

Typical bacteria which are capable of, for example, breaking down aliphatic and aromatic hydrocarbons, are Pseudomonas strains, such as, for example, *Pseudomonas putida*, Acinetobacter, Gram-positive cocci, Gram-positive rods, particularly of the Corynebacterium and Arthrobacter type, yeasts, such as, for example, Candida species, fungi, such as, for example, *Trichoderma resei*, Chaetomium, Neurospora, Cladosporium, Botrytis and Penicillium.

In the method according to the invention, the treatment time required for the decontamination of soil is generally around six months, but this time depends on many external factors. On the one hand, the nature and concentration of the contaminants and the nature and number of the microorganisms employed play an important role, on the other hand, parameters such as, for example, the temperature, are decisive. In spite of this, it must be noted that by the method according to the invention it was possible to reduce markedly the necessary treatment time, compared with conventional methods.

In addition to the microbiological degradation of contaminants which has been described, it is possible to extract the contaminants by means of suitable solvents while utilizing drainage. In this extraction, the extractants are applied by spraying. It must be ensured by suitable measures, such as, for example, covering the treatment area, that no extractants can pollute the environment. The extractant is then collected by means of the drainage and worked up.

The major amount of the extractant employed is freed from the contaminants, for example by distillation or extraction, and can then be re-used. The amount of contaminants which has been liberated, in contrast, is eliminated for example in an incinerator or the like.

Examples of substances which are suitable for the extraction are—depending on the contaminants to be removed—volatile organic solvents, for example alcohols, water and solutions of sequestering agents. This combination of microbiological degradation and extraction method is applied especially in those cases when the material to be treated contains contaminants which cannot be broken down by microbes, or only with difficulty, for example heavy metals.

A further preferred embodiment of the method according to the invention consists of the combination of the microbiological degradation method which has been described, with the removal of soil air by pumping which has also been described. This preferred embodiment is applied especially in the case of those contaminated soils which in addition to further contaminants also contain highly-volatile pollutants.

The method according to the invention is now illustrated in greater detail with the aid of the example below.

USE EXAMPLE

First, a microbiological degradation area is established which is sealed tightly against the subsoil, due to the immediate vicinity of protected drinking-water catchment zones (cf. FIG. 1).

To accommodate the soil to be treated (1), a flat pit is first excavated, and the excavated soil is banked up on the side in the form of dyke. After the pit has been provided with a compacted layer of sand (2) of 10 cm thickness, it is covered with a polyethylene sealing web (3) (mallet plate) which is held in place on the sides. A protective nonwoven (4) is now laid and provided with a gravel hard core (5) (grain size 8-32 mm) to accommodate the drainage pipes. The drainage (6) opens out into a collecting shaft in which the percolating water, water from precipitation and treatment water which occurs can be collected and fed to the treatment plant (7). A filter nonwoven (8) is then added to the gravel layer as a cover. On top of the filter nonwoven, there is arranged an active aeration system, consisting of slotted filter tubes ($\phi$ 100 mm) which are located approximately 30 cm above the filter nonwoven. The distance of the tubes to each other is 2 m. The filter tubes are connected to a collecting line via hoses and sluice valves. The valves make it possible to aerate the clamps individually. For the aeration there is also arranged a compressor with a pressure reducer. Drainage tubes (9) ($\phi$ 150 mm) are also arranged between the filter tubes for passive aeration or ventilation of the clamps. Moreover, appropriate devices (10) for irrigating the treatment area with clean waste water are also arranged. The construction of the degradation area is represented in FIG. 1 in the form of a diagram. In what follows there is described the microbiological purification of contaminated soil under an old factory building which is to be rebuilt.

The contaminated soil under the building consists of silty clay material with occasional sand lenses. Below a depth of about 1.5 to 2 m, the soil is dry and very hard fine silt. Such a soil is distinguished by a low permeability for air and water. The contaminated soil is excavated and put in intermediate storage in watertight containers.

The likewise contaminated bottom of the cellar and the contaminated foundations of the old building are likewise excavated and comminuted in a crushing plant down to the size of sand grains ($\leqq$ 6 mm).

The excavated soil shows that the distribution of the individual pollutants is highly inhomogeneous. Analyses show that there are the following maximum amounts of pollutants in mg per kg of soil:

| | | |
|---|---|---|
| Benzene | | 66.0 |
| Toluene | | 740.0 |
| Ethylbenzene | | 104.9 |
| Xylenes | | 2030.4 |
| Cumene | | 24.2 |
| Mesitylene | | 49.8 |
| tert.Butylbenzene | | 141.1 |
| Turpentine oil | hydrocarbons | |
| Phthalic esters | including polar | 10200.0 |
| Fatty acid esters | compounds | |

The average amount of pollutants is: benzene 7 mg/kg, aromatic substances 171 mg/kg, hydrocarbons 432 mg/kg. No other compounds were found.

In some cases, benzene had permeated as far as the chalk marl—about 3.5 m beneath the surface—while the contamination with alkylated aromatic substances was nearer to the surface. The amount of phthalic esters and fatty acid esters was largely restricted to the bottom of the cellar and the area beneath joins and cracks in the concrete. As in the case of the alkylated aromatic substances, turpentine oil was also observed near the surface.

Microbiological examinations of the soil excavation showed that a microflora and microfauna were present. Besides Pseudomonadaceae, mainly fungi were found, such as, for example, *Trichoderma resei*, Chaetomium, Neurospora, Cladosporium, Botrytis and also Penicillium. The number of specimens was around $10^4$ to $9 \times 10^4$ microorganisms/g of excavated soil.

The comminuted building rubble is mixed in a mixer with the contaminated soil in the ratio 1:1. The contents of the mixer (total contents about 4000 tonnes) is transferred to the degradation area into clamps of a height of up to 2 m.

The clamps are aerated by means of the drainage pipes (passive aeration) as well as via the aeration system (active aeration) by means of a compressor. In addition, the clamps are sprinkled with water from the operator's own treatment plant. This irrigation is carried out as a function of the weather (taking into account the amount of precipitation, danger/occurrence of ground frost). During the 6 months' treatment period from Oct. to Mar., a total of about 140 m³ of treatment water are applied.

In order to avoid transport into the soil to be treated of organic waste water constituents—which have only been eliminated by sludge adsorption—and heavy metals, the treatment was carried out using the effluent downstream of the secondary sedimentation tank. Microbiological analysis of the purified water employed showed that the following species of microorganisms were present: Pseudomonadaceae, mainly *Pseudomonas putida*, Acinetobacter, Gram-positive cocci, Gram-positive rods, in particular Corynebacterium and Arthrobacter, as well as yeasts—Candida species. The number of specimens was around $2.2 \times 10^5$ microorganisms/g. The treated water simultaneously supplies nitrogen and phosphate as growth factors.

The use of treated water from the operator's treatment plant has the advantage that microorganisms are added to the soil which have already adapted to the pollutants of the soil, since the contaminants are fed to the treatment plant in the form of waste-water constituents.

Microbiological examinations of the clamps showed that the species of microorganisms were essentially identical to those in the effluent of the treatment plant. On the surfaces of the clamps, numbers of microorganisms of $1.2 \times 10^5$ to $1.8 \times 10^7$ per g of soil were found, at the bases of the clamps, there were $2 \times 10^5$ to mostly $2 \times 10^6$ microorganisms/g of soil.

It can therefore be concluded that the measures resulted in greatly increased numbers of microorganisms, which are between 2 and 3 decimal exponents.

After a treatment time of 5 months (Oct. to Mar.) the pollutants are already drastically reduced. Chemical analyses showed the amounts of harmful substances listed in Tables 1 and 2. For comparison, a second treatment area II was established which had a structure analogous to that of the above described area I. The difference to the above-described area I is that this area II was only aerated intensively, but not irrigated. After a treatment time of 5 months (autumn/winter), the concentrations of contaminants were likewise examined. The results are also listed in Tables 1 and 2.

A comparison of the degradation rates of the area with sprinkle irrigation with those of the area without sprinkle irrigation shows the important influence of the treated water which had been added.

TABLE 1

Maximum amount of contaminants in mg/kg of excavated soil

| | Before treatment | 4–5 months Area I with sprinkle irrigation | 4–5 months Area II without sprinkle irrigation |
|---|---|---|---|
| Benzene | 66.0 | 0.02 | 0.14 |
| Toluene | 740.0 | 0.12 | 1.50 |
| Ethylbenzene | 104.9 | 0.05 | 0.19 |
| Xylenes | 2030.4 | 0.48 | 3.60 |
| Cumene | 24.2 | 0.01 | 0.05 |
| Mesitylene | 49.8 | 0.61 | 1.78 |
| tert.Butylbenzene | 141.1 | 0.05 | 0.25 |
| Turpentine oil / Phthalic esters / Fatty acid esters  a) | 10200.0 | 600.0 | | a) Summarized as hydrocarbons including polar compounds

TABLE 2

Average content of contaminants in mg/kg of excavated soil

| | Before treatment | 4–5 months Area I with sprinkle irrigation | 4–5 months Area II without sprinkle irrigation |
|---|---|---|---|
| Benzene | 7 | 0.02 | 0.14 |
| Aromatic substances | 171 | 1.06 | 7.51 |
| Hydrocarbons including polar compounds | 432 | 92.0 | n.d. | n.d. not determined

The elimination sequence which has been observed tert.butylbenzene > toluene > xylenes > cumene > ethylbenzene >> mesitylene is largely identical to the information from the literature on the biological degradation of aromatic hydrocarbons. In this context, it must be borne in mind that in the treatment with clarified waste water a mixed flora and fauna was added, and that therefore deviations from information from the literature, which is based on experiments with pure-grade cultures, are possible.

This sequence which has been found shows that the biological degradation is the dominant factor in the degradation of contaminants and not physical effects, such as evaporation and/or elution by precipitation and irrigation water. If the physical effect had been dominant, the following sequence would have been expected: benzene > toluene > ethylbenzene > cumene > xylenes > tert.butyl benzene > mesitylene.

What is claimed is:

1. In a method for the microbiological decontamination of soil, comprising the steps of:
   1. excavating and treating the contaminated soil;
   2. banking up the treated soil on a prepared subsoil in the form of regeneration clamps; and 3. providing the clamps with oxygen while microbiological degradation of the contaminants takes place;

wherein the improvement comprises treating the contaminated soil by mixing the soil with a composition selected from the group consisting of concrete, building rubble and mixtures thereof, which had been previously comminuted to a particle via <10 mm.

2. A method as claimed in claim 1, wherein the concrete and/or building rubble is likewise contaminated.

3. A method as claimed in claim 1, wherein the building rubble had previously been comminuted to a particle size <6 mm.

4. A method as claimed in claim 1, wherein the mixing ratio soil : concrete and/or building rubble is between 1:9 and 9:1 parts by volume.

5. A method as claimed in claim 1, wherein the mixing ratio soil : concrete and/or building rubble is between 1:1 and 3:1 parts by volume.

6. A method as claimed in claim 1, wherein the clamps are supplied with microorganisms during microbiological degradation of the contaminants.

7. A method as claimed in claim 1, wherein the clamps are supplied with those microorganisms during microbiological degradation of the contaminants which are adapted to the substances contaminating the soil.

8. A method as claimed in claim 1, wherein the clamps are sprinkled with water during microbiological degradation of the contaminants.

9. A method as claimed in claim 1, wherein the clamps are sprinkled with water during microbiological degradation of the contaminants which preferable contains microorganisms and/or nutrients for the microorganisms.

10. A method as claimed in claim 1, wherein the clamps are aerated during the microbiological degradation of the contaminants in order to provide them with oxygen.

11. A method as claimed in claim 1, wherein the clamps are aerated during the microbiological degradation of the contaminants both passively by means of drainage pipes and actively by means of a compressor and an aeration tube system.

12. A method as claimed in claim 1, wherein the subsoil of the clamps is sealed by means of tight webs.

13. A method as claimed in claim 1, wherein a drainage is incorporated in the clamps, via which the percolating water, water from precipitation and treatment water which occurs is collected and fed to a treatment plant.

14. A method as claimed in claim 1, wherein soil air is additionally pumped off during the microbiological degradation of the contaminants.

15. A method as claimed in claim 1, wherein an extraction of contaminants which are not biodegradable, or only with difficulty, is additionally carried out during the microbiological degradation of the contaminants.

* * * * *